United States Patent [19]

Anthony

[11] 4,294,664

[45] Oct. 13, 1981

[54] LATENT HEAT RECIRCULATING SYSTEM

[75] Inventor: Myron L. Anthony, Grand Junction, Colo.

[73] Assignee: Sax Zzyzx, Ltd., Clifton, Colo.

[21] Appl. No.: 169,441

[22] Filed: Jul. 16, 1980

[51] Int. Cl.³ .......................... B01D 3/02; B01D 3/22
[52] U.S. Cl. ........................................ 203/19; 203/24; 203/26
[58] Field of Search ........................... 203/19, 24, 26; 202/177, 180; 62/40

[56] References Cited

U.S. PATENT DOCUMENTS

| | | | |
|---|---|---|---|
| 1,860,554 | 5/1932 | Ricard et al. | 203/19 |
| 2,893,926 | 7/1959 | Worthen et al. | 202/177 |
| 3,486,985 | 12/1969 | McGrath | 203/24 |
| 3,511,756 | 5/1970 | Guerrieri | 203/26 |
| 3,597,465 | 8/1971 | Karafian et al. | 203/25 |
| 3,970,441 | 7/1976 | Etzbach et al. | 62/40 |
| 4,094,655 | 6/1978 | Krieger | 62/40 |

*Primary Examiner*—Frank Sever
*Attorney, Agent, or Firm*—Kinzer, Plyer, Dorn & McEachran

[57] ABSTRACT

The latent heat of condensation released by condensing a process vapor is captured in a fluid contained in a latent heat recirculating system; the captured heat is returned by the fluid to the body of process liquid for continued vaporization.

11 Claims, 15 Drawing Figures

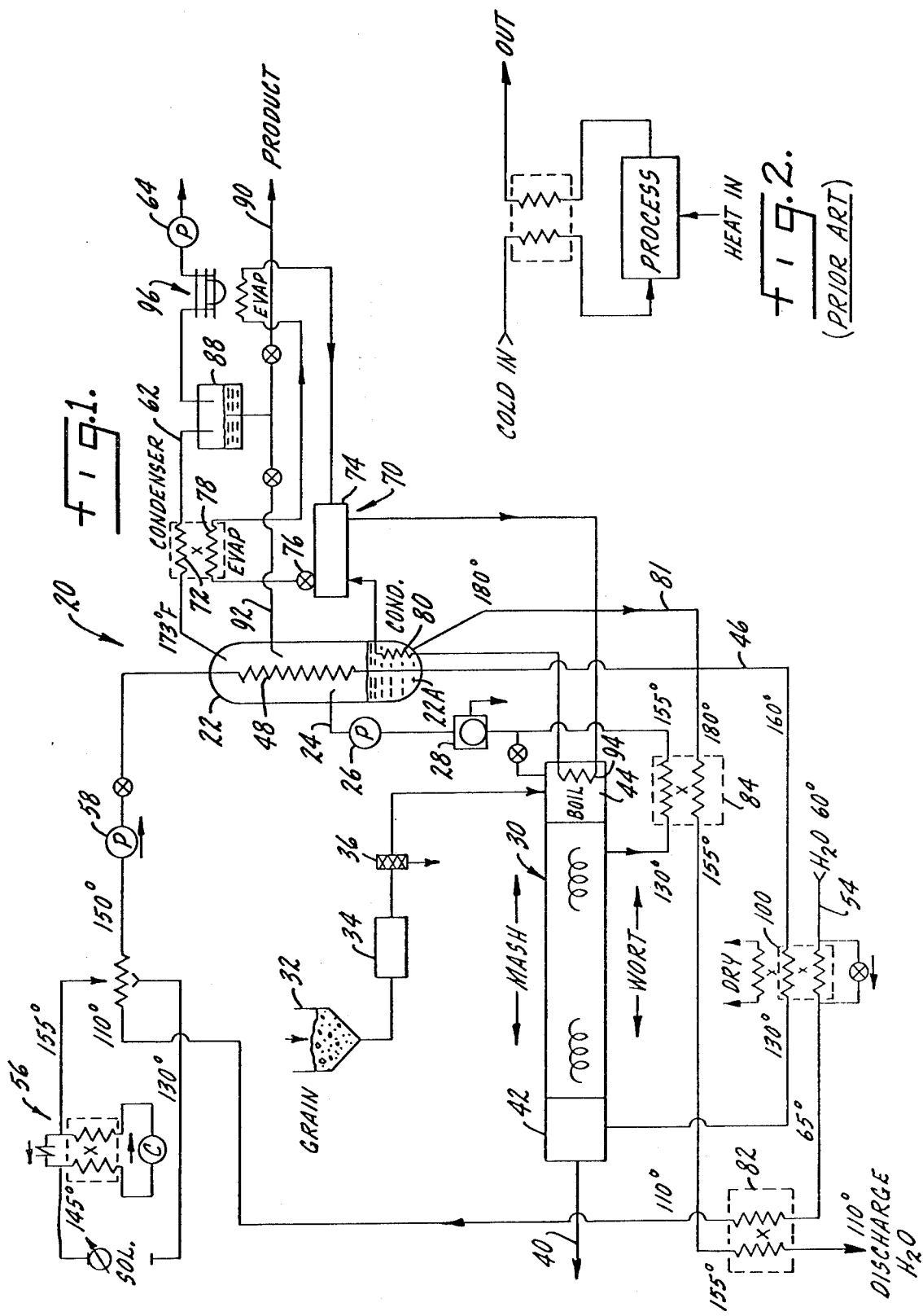

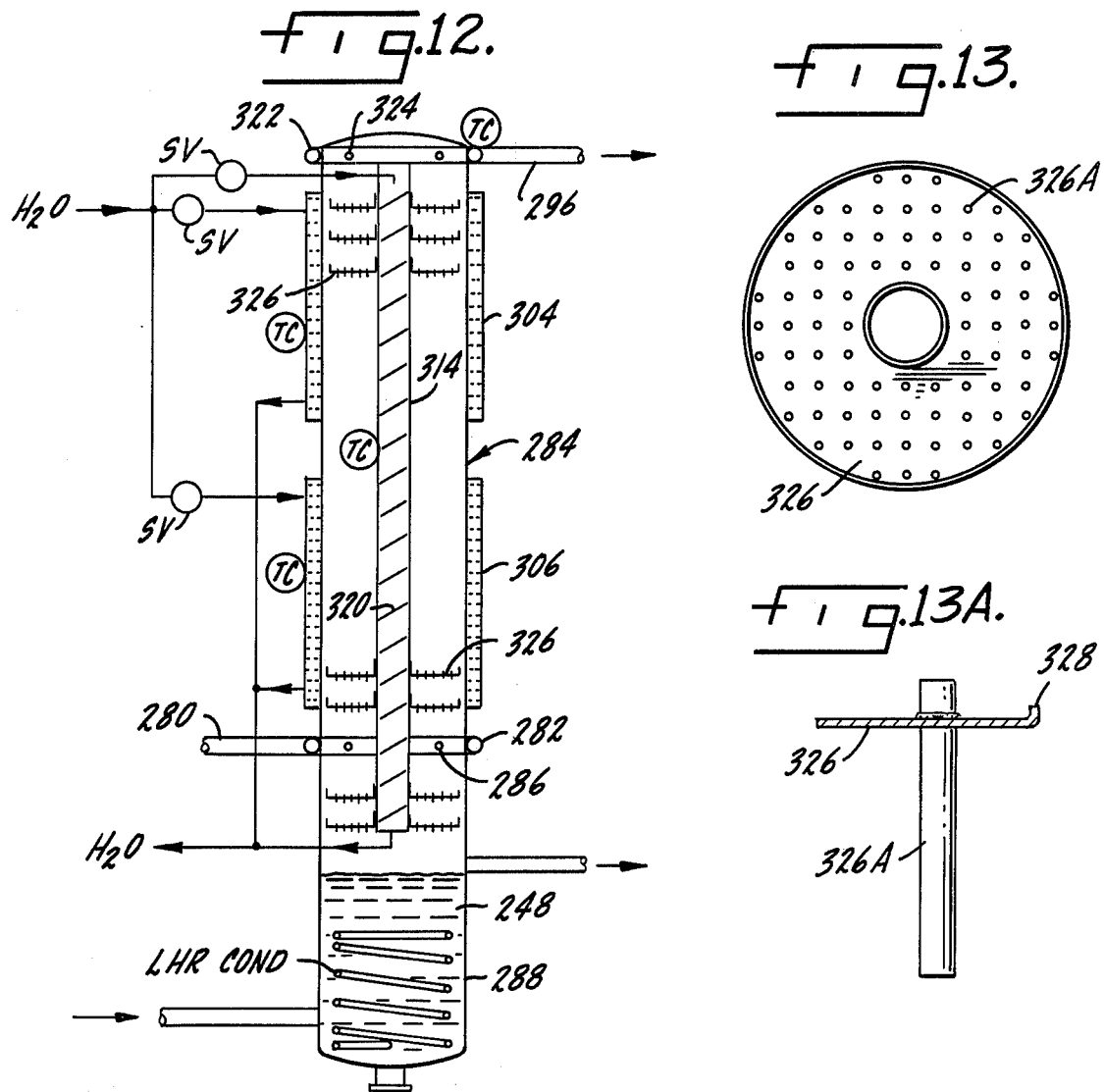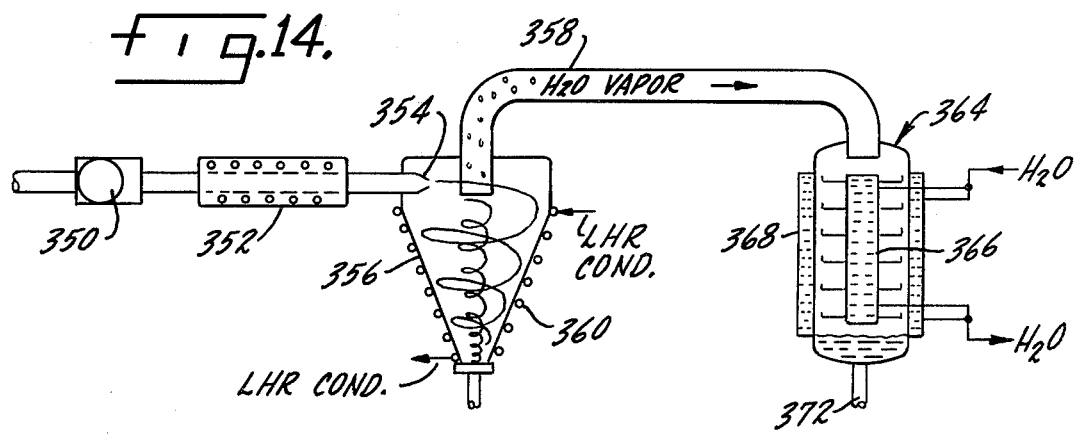

LATENT HEAT RECIRCULATING SYSTEM

This invention relates to processing a body of liquid to derive a volatile constituent and condensing that constituent as a liquid product while capturing its latent heat of condensation. The captured latent heat at least in part is returned to the process stream.

A specific application of the invention is shown in the first figure of drawing where ethanol vapor is obtained from a boiling mixture of wort and water. Specifically in this regard an object of the invention is to efficiently boil the mixture by harnessing the latent heat of condensation of ethanol in a latent heat recovery system. Other objects of the invention are to efficiently allocate the latent heat to several areas of the process system, to recover latent heat in a loop of chiller water which may be used to condense the vapor and to efficiently extract sensible heat from the product condensate.

The drawing for the most part is schematic or diagrammatic, wherein:

FIG. 1 shows a system for recovering ethanol;

FIGS. 2, 3 and 4 show certain prior art heat-exchange systems;

FIG. 12 is a schematic view of a rectifier column;

FIG. 13 is a plan view and FIG. 13A is a side view of a tube in the column; and

FIG. 14 is a schematic view of a dryer incorporating features of the present invention.

Figure 3:
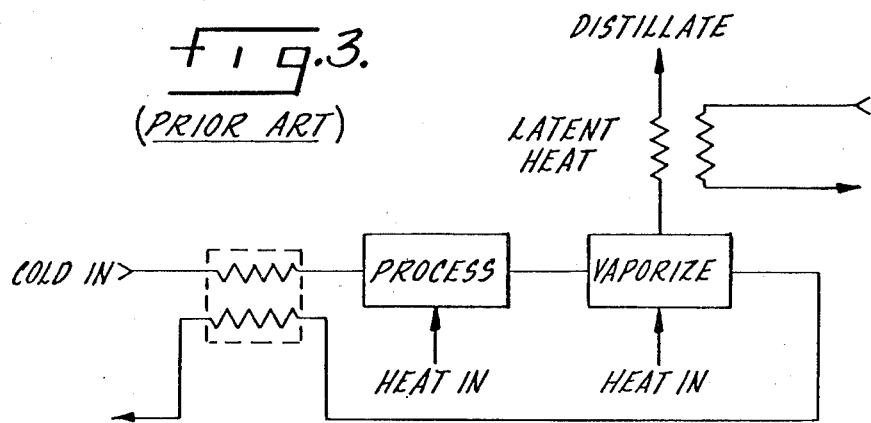

FIG. 1 is a schematic view of a fractionating still and related system for obtaining ethanol from fermenting grain. The distillation system 20 comprises a distillation column 22 which may be twelve feet high, for example, eighteen inches in diameter. The still is charged with wort (which can be viewed as a "near" beer) delivered to the still through an inlet 24 having a pump 26 and a filter 28. The values given in FIG. 1 are representative only but could be an actual case and are certainly not unrealistic.

The wort is produced in a fermentation vessel or chamber 30 charged at one end with grain from a hopper 32. The grain is crushed in a mill 34 and screened at 36 prior to delivering the finely divided grain to one end of the fermentation chamber 30 where the grain is boiled in water and in the presence of enzymes to break down the starch to a sugar for the fermentation process. Inside the fermentation chamber, movement of the grain or mash (to which yeast has now been added) is in one direction while the wort product of increasing alcohol content moves in the opposite direction so that spent mash is delivered from the left end of the fermentation chamber at 40, while the wort containing the alcohol to be recovered is extracted to the conduit 24 adjacent the opposite end of the fermentation chamber.

The spent mash is washed in a wash chamber 42 opposite the boil chamber 44 and washing is accomplished by hot water in a return line 46 connected to the heating coil 48 inside the alcohol still or distillation chamber 22.

Water for the process is local water (municipal service water, tap water, well water) conducted by a conduit 54 to a solar panel 56 located on the site. At the solar panel, the cold inlet or source water, circulated by pump 58, undergoes heat exchange with extremely hot air heated in the solar panel in accordance with the principles set forth in my copending application, Ser. No. 043,232, filed May 29, 1979. In fact, the water thus heated may be viewed as water at or near 150° F. fed to the heating coil 48 inside the fractionating still 22 where ethanol is being distilled from the wort in charge chamber 22A at the bottom of the still. Thus the raw material at the bottom of the still is a mixture of wort and water and of course it is possible in accordance with the principles of the present invention to use another raw material for deriving ethanol, or even the related alcohol, methanol.

In any event, in the instance of ethanol, the mixture in chamber 22A in the still may be viewed as equivalent to one volume part of ethanol and seven volume parts of water representing the mixture being distilled. The ethanol vapors are extracted by conduit 62 connected to a vacuum pump 64. It may be mentioned at this point that in the distillation process the wort or dilute solution of ethanol is distilled in a much higher proof or more pure form substantially stripped of entrained water.

Vaporization in the case of ethanol requires approximately three hundred and sixty BTU for each pound of ethanol vaporized. This latent heat is recovered in a closed loop latent heat-recirculating loop 70 system so that what amounts to the heat of condensation (the same caloric quantity as the heat of vaporization) may be returned to the still to aid the distillation process. To enable this to be accomplished, the loop 70 is interposed between a condenser coil 72, where the ethanol vapor is condensed, and the charge chamber 22A at the bottom of the still 22. The term "interposed" is used to signify that the latent heat-recirculating system is used to capture or harness the heat of condensation released by the condensing ethanol vapor in the coil 72, transferring or releasing that heat to the bottom of the still where ethanol is being vaporized. In effect, latent heat is restored or returned to the process liquid, which in this case is the wort in the still.

The latent heat-recirculating or return system may be charged with FREON 12 as the fluid medium for transporting the latent heat BTUs. This system also includes a compressor as 74 and an expansion valve as 76.

The evaporator coil 78 incorporated in the closed loop system is positioned in heat exchange relation with the ethanol condenser coil 72 and the cold or expanded gas at low pressure in the evaporator coil 78 chills the ethanol vapor in the condenser coil 72, causing the latter to condense, releasing its BTU heat of condensation to the gas in the evaporator coil 78 which, in the instance of ethanol as already noted, is approximately three hundred sixty BTU for each pound of ethanol.

The gas on the low pressure side of the loop 70 is compressed by the compressor 74 so that more heat content (superheat) is added by the compressor, in proportion to the pressure, and the liquid medium is moved to the condenser coil 80 which is immersed in the water-wort mixture (process liquid) inside the still where the heat of vaporization of ethanol is released to aid the distillation process.

Ethanol boils at about 173° F. Hot water (say at 180° F.) may be withdrawn from the bottom of still 22A through conduit 81 and subjected to a heat exchange with the cold "tap" water at 82. Heat balances consistent throughout the present disclosure thus far (for example: circulate 8300 pounds of water per hour, treat 2000 pounds grain per hour and condense one hundred twenty-five gallons ethanol per hour) allow a prediction of a discharge temperature for water, after heat exchange at 82, of approximately 110° F. which may be used for on-site hot water and indeed the discharge temperature of 110° F. takes into account an intermediate heat exchange at 84 for other purposes, if desired, such as heat exchange with the wort being delivered from the fermentation chamber to the still 22.

Thus it will be seen from the disclosure thus far that there are two basic heat exchanges by which the heat of condensation of ethanol is conserved and returned to the process. First, the heat of condensation is recovered at the evaporator 80 of system 70, returning the heat of vaporization to the distillation still to aid the distillation process; and hot water may be withdrawn from the bottom of the distillation still for heat exchange with the inlet cold water (local water) so that the latter may be heated prior to being fed to the solar panel heat exchanger.

The condensed ethanol is collected at chamber 88 which may be drained to obtain the product at 90 and to return some ethanol at 92 for reflux to the distillation still.

Of course it is not necessary to add appreciable superheat by the compressor in the latent heat recirculator loop, but if so it may be sufficiently so that a portion of the superheat and the latent heat of condensation may be used not only to aid the distillation process at coil 80 but also, by means of a second condenser coil 94, to cook or boil the mash at 44 where starch is initially converted to sugar.

In like manner, the expansion valve 76 may be so adjusted, together with variance in the compressor 74, so that any water vapor that may be entrained in the vacuum line 62–64 may be condensed at a cold trap 96 by a second evaporator coil 98 incorporated in the evaporator loop.

A second evaporator coil (98) and second condenser coil (94) need not be used; all the latent heat and superheat in the latent heat restoring system 70 may be used to boil the wort and hot water mixture. Water withdrawn from the charge chamber 22A of the still may be used in direct heat exchange relation at boil chamber 44.

The process described above may be compared to simpler and more primitive processes heretofore utilized but where a great deal of useful heat has been discarded, particularly the latent heat of vaporization. Power plant vapor plumes and exposed petroleum fractionating columns are everyday visible evidence of such wasteful practices. Thus, since condensation of a distillate vapor by necessity takes place at a substantially lower temperature than that of the boiling temperature of the body of process liquid from which the vapor is derived, it is impossible under ordinary thermodynamic considerations to return or recycle the very large amount of latent heat removed from the distillate condenser back to the higher temperature boiler. Normally this energy can only be discarded and wasted by means of a cooling fluid such as water or air.

In short, a process effluent ordinarily contains a very large amount of heat but at a temperature lower than that of the process input requirement and it is therefore thermodynamically unrecoverable in open systems such as shown in FIGS. 2 and 3 where, at best, inlet water at a colder temperature may receive heat by exchange (FIG. 2) or some of the latent heat of vaporization may be recovered in a simple heat exchange as shown in FIG. 3.

It may be mentioned, though elementary, that the purpose of the expansion valve, downstream of the compressor, is to allow the liquified BTU transport fluid (liquified at the condenser) under high pressure to pass at a controlled rate into the low pressure part of the latent heat recovery system. Some of the liquid evaporates the instant it passes the expansion valve, but the greater portion is vaporized in the evaporator at the low pressure maintained by the exhausting action of the compressor. The compressor in turn increases the temperature and pressure of the hot gas and discharges it to the condenser. In passing through the condenser, the hot gas gives up the heat which it absorbed in the evaporator plus the heat equivalent (superheat) of the work done on it by the compressor. Indeed, the superheat must be removed before the high pressure vapor can condense, and under the present invention I conserve both the latent heat and superheat.

Figure 4:
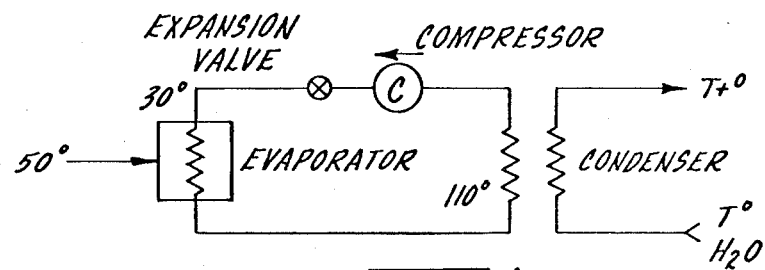

FIG. 4 is a diagram of a typical heat pump; the outside temperature may be 50° F., the refrigerant evaporating at 30° F. and condensing at 110° F. The water by heat exchange with the condenser is raised from T° to T+°.

Figure 5:
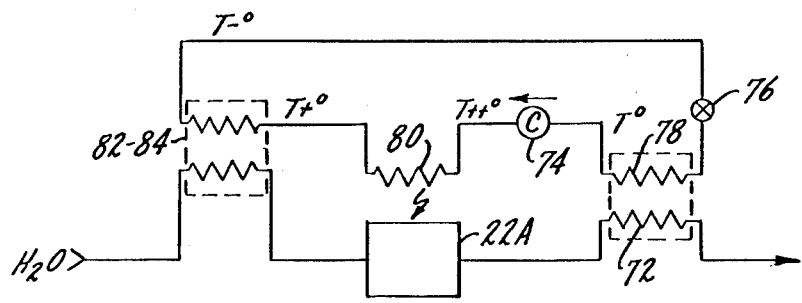
FIGS. 5 through 8 are used to emphasize features of FIG. 1.
Figure 6:
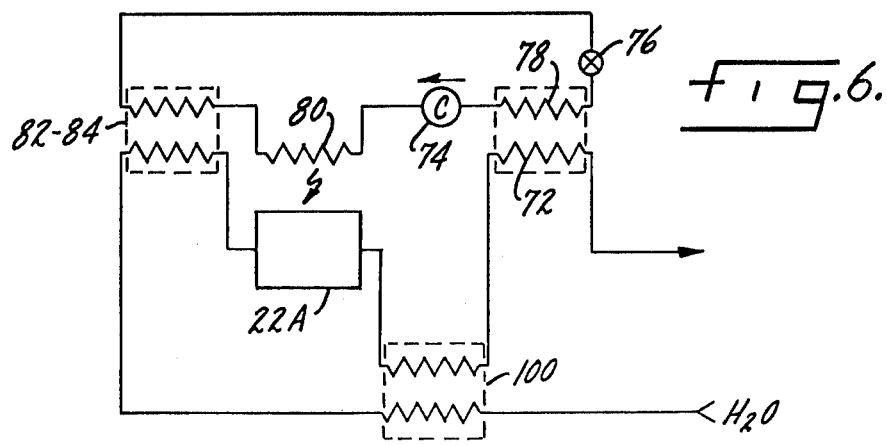

In comparison to known practices, FIG. 5 represents a highly simplified and diagrammatic view of some principles of the present invention embodied in FIG. 1 in which a closed loop system for capturing and using latent heat incorporates a compressor as 74, an expansion valve as 76, an evaporator as 78 and a condenser as 72 faced or coupled to the process system to capture and exploit the heat of condensation which, except for the usual unavoidable losses, is returned completely to the process system. In FIG. 5, some arbitrary values have been assigned to a process where three hundred sixty BTUs are required to vaporize a pound of ethanol: ideally, three hundred sixty BTUs are exchanged to the latent heat recovery evaporator (temperature of the hot gas is T°) and it may be assumed that the fluid (e.g. FREON) leaving the compressor is at T++°, superheated, that is, in the sense of having more heat for exchange than merely the latent heat of condensation acquired from the condensing ethanol. This excess heat or superheat may be released to the charge chamber 22A of the still along with some of the latent heat (reduce to T+°) and any excess may be exchanged at 82–84 to the incoming cold water and/or wort being delivered to the still. The temperature of the liquid entering the expansion valve has been reduced to T°. Referring to FIG. 6, hot water used in the process may be passed in exchange at 100 with the incoming cold water, as also denoted in FIG. 1, and may also be employed to heat air used to dry the grain in storage, as shown in FIG. 1.

The principle of the invention may be extended, FIG. 7, so that water may be used to recover both latent and process heat subsequently transferred to the hot gas contained in the latent heat recovery system. Thus, a continuous body of water is contained in a system comprising a pump 200, a circulating pipe 202, a condenser 204 and a chamber 206 for recovering caloric or sensible heat.

The condenser 204 is representative only and is shown as accomplishing nothing more than condensing steam carried by a pipe 210 communicating with a hot water boiler 212, in turn fed with water from a cold water (source) pipe 214.

The boiler 212 is heated to the boiling point, to boil the water, by a hot gas superheated by a compressor 216. The superheat gas and boiler are coupled in heat exchange relation at 218 and the fluid for transporting the latent (BTU) heat of the steam is circulating in a pipe 220.

The incoming cold water condenses the hot BTU transporting gas at 222 so that the latent heat of steam condensation is released to the incoming cold water; hence the amount of superheat added by the compressor need only be that which is necessary to bring the water in boiler 212 to the boiling point.

The condensed gas in pipe 220 downstream of 222 is forced through an expansion valve 224, absorbing heat in chamber 226 which contains hot water being circulated by pump 200. Thus, the condensed transport fluid, earlier liquified at the condenser, is vaporized in part by the expansion valve and in part by the latent heat recovered at the process vapor condenser 204; indeed, there may be secondary recovery of sensible or caloric heat from the process vapor (steam at 212°) at a downstream heat exchange chamber 206.

It will be understood that the system controls will be such as to achieve maximum efficiency. That is, the rate of pump 200 will be varied, along with variations in the compressor (gas superheat) and expansion valve (low pressure) of the latent heat recovery loop, in accordance with the nature of the transport fluid and the process fluid to maximize BTU recovery (recovery at 204,206) for return to the process system at 218 and 222.

Figure 7:
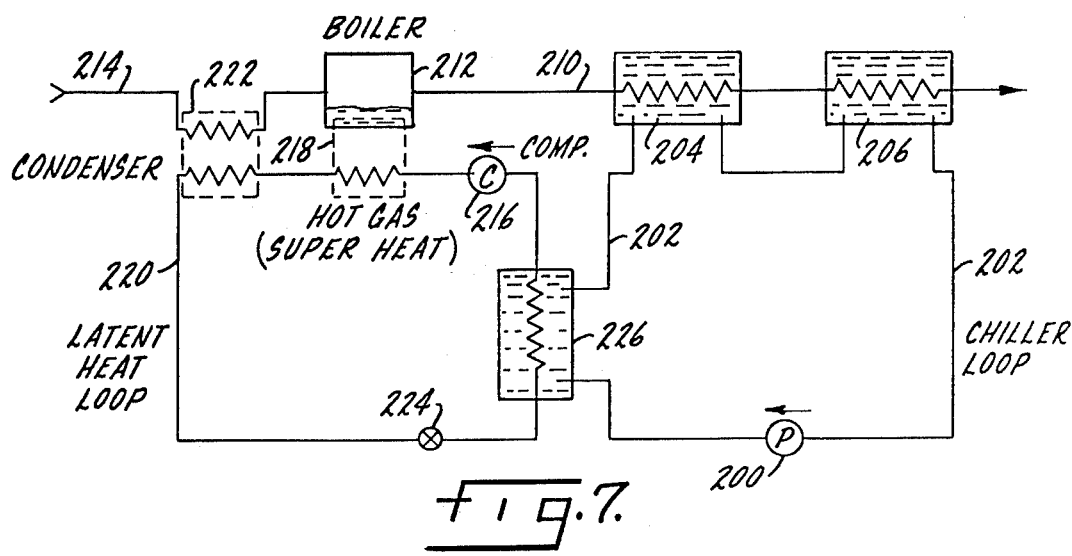

In FIG. 7, water is the process liquid and steam is the process vapor, condensed at 204. The process liquid being boiled could be a wort and the vapor would be the resultant ethanol values, condensing at 204.

Figure 8:
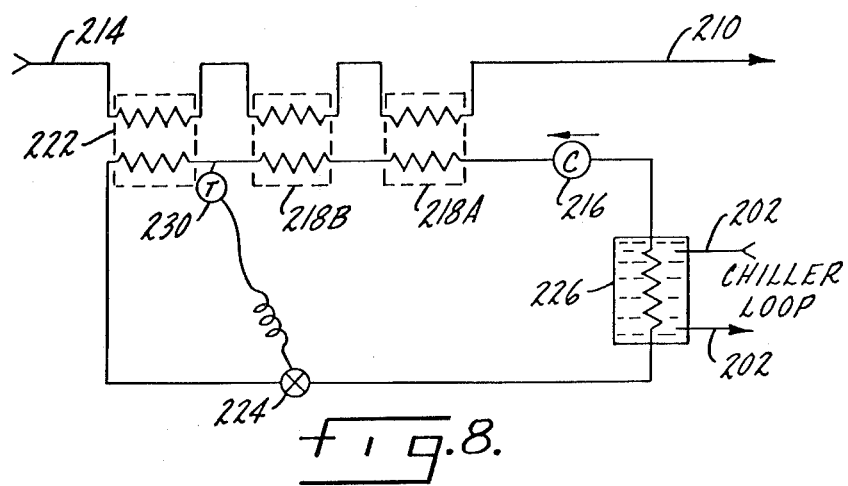

FIG. 8 is an elaboration on FIG. 7. There may be two heat exchangers 218A and 218B, downstream of the boiler, exchanging superheat to the incoming cold water prior to the hot BTU transport gas being condensed at 222. The expansion valve 224 may be controlled by a thermostat 230 which senses the temperature of the uncondensed hot gas immediately upstream of the heat exchanger 222 so that the expansion valve may be choked in response to the amount of superheat in the hot gas just before the hot gas is condensed to release the latent heat.

Figure 9:
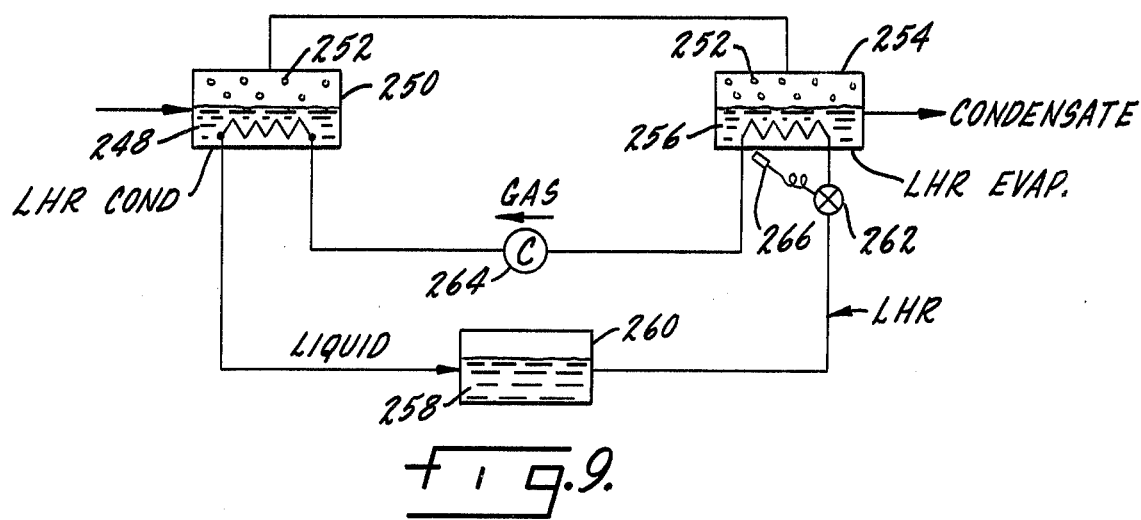
FIG. 9 is a simplified version of FIG. 10.

In FIG. 7 it is shown that both latent heat of the process vapor and sensible or caloric heat of the condensate may be captured in the coolant used to condense the vapor before return to the process. In FIG. 9, a latent heat recovery or return loop is identified by LHR and the related evaporator (EVAP) and condensor (COND) are identified by similar legend. The process liquid 248 is boiled in a vessel 250 and the process vapor 252 is condensed in a process condenser 254, resulting in the condensate 256 representing the desired product.

The transport fluid (BTU transport fluid) is in a liquid state 258 in a receiver 260 and is pulled through an expansion valve 262 by the compressor 264. The expansion valve is throttled more or less, under the control of a thermocouple 266 which senses the temperature of the condensate 256.

Figure 10:
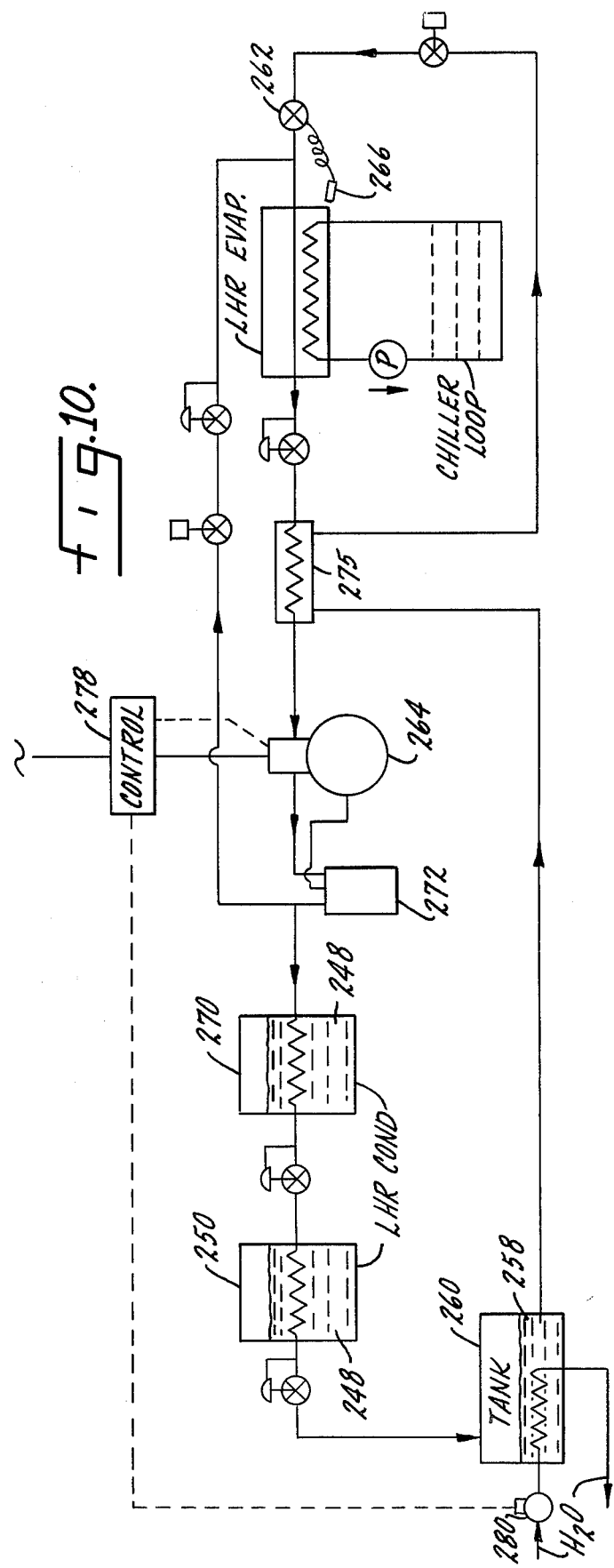
FIG. 10 is a diagrammatic view of another ethanol recovery system.

FIG. 9 is an aid for following FIG. 10 and identical reference characters identify identical functional units. The system shown in FIG. 10 is an ethanol recovery system more sophisticated in some respects than the system shown in FIG. 1.

The boiler 250 for the process liquid 248 (wort) is preceded by a cooker vessel 270 in which the grain mash is hydrolyzed incidental to converting the grain starch to sugar. The BTU transport fluid (liquid 258 in receiver 260) is circulated by the compressor and is in the hot gas state as it moves from the compressor through the vessels 270 and 250 in heat-exchange relation with the process liquid, being converted back to a liquid as a result. The larger BTU load is at the vaporizer 250 and the smaller BTU load is at the cooker 270.

Any oil (for compressor lubrication) which may be entrained in the BTU transport fluid downstream of the compressor is stripped at an oil stripper 272 and part of the hot gas (for startup purposes only) may be diverted back to a point upstream of the LHR evaportor, immediately downstream of the expansion valve.

The condensed (liquid) BTU transport fluid may be preheated at 275 in heat-exchange relation with the hot BTU transport gas immediately upstream of the compressor 264. The compressor is powered by line power, through a control 278 and the same control may be used to vary a valve 280 for admitting local water.

The operating level of pressure and temperature of the BTU transport gas is established at the heat exchanger 275 and hence the latter represents an important feature, the enthalpy chart of the system shown in FIG. 10, as it were.

Pressure-regulating and other control valves are strategically located as shown in FIG. 10.

FIG. 10 is schematic, of course, and two features require detailed consideration. First, in this connection, the boiler 250 and LHR evaporator in actual practice are virtually wrapped about one another as will be described in connection with FIG. 11. Secondly, the LHR evaporator (LHR EVAP) includes a chiller loop (cold water loop) in heat-exchange relation with LHR EVAP as in FIG. 7 and this also will be described in detail.

Figure 11:
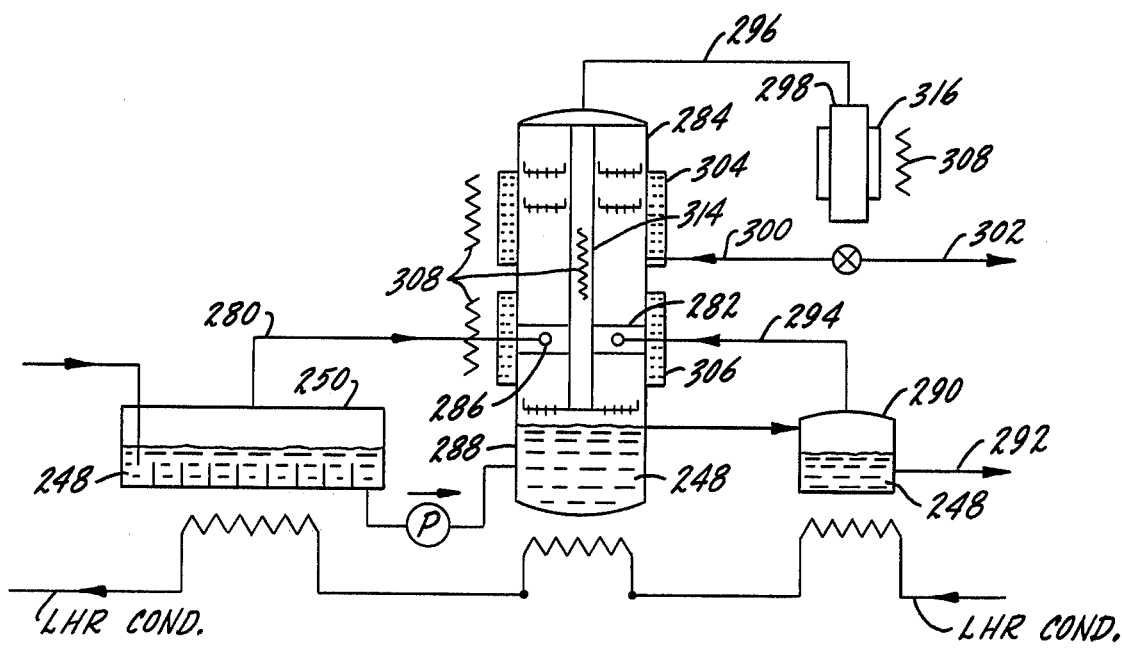
FIG. 11 is a schematic view of another ethanol recovery system incorporating the principles of FIG. 10.

FIG. 11 (though schematic) may be considered a partial detail view of FIG. 10. The vapor space in the boiler 250 or evaporator for the process liquid is tapped by a pipe 280, FIG. 11, feeding the process vapor to an annular delivery ring 282 inside a stripper-rectifier column 284, the vapor being released through ports 286 in the ring 282, distributing the vapor evenly into the cross-section of column 284. The column 284 is of unique construction, as will be shown, such that the length-to-diameter ratio may be as small as six-to-one, made possible by effective thermotransfer coefficients and thermogradients in conjunction with an external chiller jacket and an internal coaxial chiller column. Typically, column 284 may be eighteen feet high and three feet in diameter.

The lower chamber 288 in the stripper-rectifier column is an afterboiler charged with hot (boiling) process liquid from the main boiler 250 and may either be heated by an auxillary heater or by some of the superheat imparted to the LHR hot gas as shown in FIG. 11.

A reboiler 290 may be coupled to the afterboiler, heated by the hot BTU transport gas. The fully spent biomass liquor, from which the ethanol content is altogether stripped for practical purposes, is discharged at 292. Any process vapor derived at the reboiler is delivered by pipe 294 to the stripper-rectifier.

It will be recognized on comparing FIG. 11 to FIGS. 9 and 10 that the condenser in the latent heat recovery loop (LHR COND) serves three purposes in FIG. 11: to add heat (caloric or superheat) to the reboiler, to add heat (caloric or superheat) to the afterboiler and to boil the aqueous-biomass mixture in tank 250 by releasing, finally, the latent heat of condensation. Thus the heat content in the BTU transport fluid is dropped off at different loads and different temperatures. For example, the boiler may take ninety percent; the other two only five percent each, at 288 and 290, respectively. Recovery of the latent heat of condensation, FIG. 11, will now be explained.

There is a great deal of water vapor inherently coupled to the ethanol vapor (alcohol is hydrophilic) and within the column 284 the effort is to strip as much water as possible from the ethanol vapor which is educted by a pipe 296 from the top of column 284 to a condenser 298 where the condensate is recovered as a useful product. Some of the condensate may be refluxed through pipe 300 communicating with the interior of column 284; the product is delivered by pipe 302.

Inside the stripper-rectifier column 284 the process vapor (it need not necessarily be ethanol) is being both condensed and revaporized in the vapor space above the body of liquid incidental to delivering efficiently a purified vapor at pipe 296. To this end the column is surrounded by a pair of water chiller jackets (e.g. lagged copper coils) 304 and 306 employed in a condensation role. These jackets correspond to the chiller loop identified in FIG. 10 and are faced or coupled in heat-exchange relation to the LHR EVAP (see FIGS. 7, 9 and 10) symbolized by 308 in FIG. 11.

The main condenser in the column 284 is a coaxial chiller tube 314 (e.g. one-half inch ID) supplied with water as will be described in more detail. Water is admitted into the top of tube 314 and trickles downward, serving the role of condenser.

The ethanol vapor which is taken off by pipe 296 is condensed at 298 as already noted. The condenser 298 is surrounded by a water jacket 316 (chiller loop) faced in heat-exchange relation to the LHR EVAP, also symbolized at 308, capturing the latent heat of condensation. Caloric heat in the condensate may be captured as already noted and returned to the system.

The stripper-rectifier is shown in more detail in FIG. 12. The coaxial chiller core or tube 314 preferably is equipped with an internal spiral baffle 320 extending the length of the inside diameter, whereby heat transfer is enhanced and the water jackets (if copper coils are not used) may be baffled on the inside as well for the same purpose. The baffles facilitate smooth and uniform thermogradients and a tortious path free of channeling effects.

Solenoid valves SV control the admittance of water to the core chiller 314 and the chiller jackets in accordance with enthalpy relations involved and corresponding temperature sensors TC are strategically positioned at the chillers. A fourth temperature sensor is faced to the eduction pipe 296 and it will be observed in FIG. 12 that pipe 296 communicates with a tubular collector ring 322 positioned inside the stripper-rectifier column at the top. The collector ring 322 is formed with ports 324 for withdrawing the ethanol vapor which by the time it reaches ring 322 is one hundred ninety proof (190°).

The chiller core 314 supports a large number of equally spaced disclike trays 326, extending like a spine the length of the chiller core. These trays, like the column itself, may be of cold rolled steel, each tray being about one-tenth of an inch thick, about twenty-four inches in diameter and spaced from one another about four inches along the length of the chiller core.

The discs are apertured in the center to fit the OD of the chiller core tube (copper brazed to the chiller core) and the flat surface area of each disc is perforated to support small diameter tubes 326A having openings substantially of capillary size therethrough to increase the heat-exchange interface between the ascending vapors and descending condensate inside the stripper-rectifier column. The peripheral edge of each disc has an annular flange or lip 328 to trap condensate for the interface heat-exchange between liquid and vapor.

The sub-system shown in FIGS. 11 and 12 should be considered in the background of FIG. 10. The hot BTU transport gas that has picked up the cooling-load heat from the evaporator-chiller (LHR EVAP and CHILLER LOOP, FIG. 10) is returned to the compressor by way of the hot gas liquid heat exchanges at the compressor vacuum intake, indicated at 275 in FIG. 10. The compressor, powered usually by an electric motor, increases the pressure and temperature of the return BTU transport fluid. This return gas, and associated return cooling-load-heat is further augmented to some extent by the relatively small compressor mechanical input, the mechanically added heat energy being generally referred to as superheat.

Hot gas from the compressor is fed to an oil separator where compressor lubricating oil is separated from the transport fluid, the oil being returned to the compressor. The hot gas stream is then directed to the hot side of the process, in this case the biomass (grain) hydrolyzer and the vapor-boiler.

Self-actuated pressure control valves as indicated are utilized to apportion to hot gas to the various distributed loads. In the instance of grain precooking the temperature requirement is somewhat higher than the boiling reactor temperature and the BTU heat load is substantially less.

In some instances a portion of the compressor hot gas discharge may be returned directly to the compressor input by way of the input heat exchanger. This bypass is generally under manual control and is used to facilitate a cold start up of the system as noted.

Depending on the BTU transport fluid in use and other system parameters, the compressor discharge temperatures can be as high as 240°-250° F. which would yield a steam pressure equivalent in the range of 10-15 PSI depending on local and atmospheric conditions.

The cooker section extracts relatively little heat from the compressor hot gas stream, the principle amount being directed to the boiler-vaporizer where large amounts of latent heat are returned.

A conventional liquid receiver tank 258 and externally cooled condenser are provided. The receiver functions conventionally but the externally cooled condenser (water cooled at 280) is used only in testing or unusual no-load situations. The process liquid stream boiler is indeed the actual condenser, operating in an unusual mode and by virtue of this unusuual operating mode the input-output thermal differences can be held to very narrow limits in a thermal recycle system, resulting in the unusually high overall system thermoefficiency where "rejected" heat is not discharged but is recycled.

A conventional filter and dessicator (not shown) may be interposed immediately downstream of the receiver 260.

Some of the thermodynamics are worthy of consideration, ignoring start-up requirements and heat losses. If we assume an ethanol plant of modest proportion, say one thousand gallons of one hundred ninety proof EtOH per day, that means, modestly, about $64 \times 10^4$ BTU/hr latent heat of vaporization from the mixed condensate, all of which is recovered except for heat losses. The sensible or caloric may also be recovered, as shown, so the net is about $130 \times 10^4$ BTU/hr.

Calculations also show that for a plant of the capacity mentioned only a 60 HP compressor is required to operate the LHR loop so the compressor "yield" in heat recovery is ($130 \times 10^4$ divided by 60) equal to about $2 \times 10^4$ BTU/hr (20000/hr) net return to the system for each horsepower of compressor (work) input.

One horsepower is itself about 2550 BTU (say 2500) so for each unit of horsepower input at the compressor, the horsepower equivalent of the heat recovery is (twenty thousand divided by 2500) which is equal to about eight horsepower, which is a significant bonus even if reduced by half, from 1:8 to 1:4 or even to 1:2.

The economics can be viewed another way. It has been shown the "yield" is 20000 BTU/hr per compressor horespower. One horsepower of compressor input requires about 0.76 killowatt hours and at three cents per killowatt hour the cost is only about 2.3 cents to return 20000 BTU to the system. Now it so happens that about 21557 BTU are required to hydrolyze (cook) and boil a wort (boil at 195° F.) which has ten percent alcohol content, recovering one gallon EtOH per hour therefrom.

From this it will be seen that at current prices only about two and a half cents needs to be spent to recover enough latent and caloric heat from the condensates, via the LHR principle here disclosed, to produce a gallon of EtOH condensate. Perpetual motion is not involved because the compressor has to be operated at a cost in killowatt hours, but this is a small cost compared to the BTU recovery.

Production of alcohol from grain in the ordinary distilling process results in a product known as dry distillery grain (DDG) which has a high moisture content, nearly eighty percent water. This product (DDG) can be used locally as a food supplement in animal husbandry but because of the large moisture content, its use is restricted and indeed the DDG is often discarded. A bushel of corn, weighing fifty-six pounds, contains seventeen pounds of DDG. Removal of moisture is the problem. If the product could be dried effectively it could be transported at greatly reduced cost and an object of the invention is to enable this to be accomplished in the manner shown in FIG. 14.

According to FIG. 14, the DDG resulting from the fermentation process to produce the wort is subjected to separation in a cyclone mill (process vessel) to remove the water as vapor which in turn is condensed. Again, the heat of condensation is recovered in a latent heat recovery loop and this latent heat is employed as an aid in drying and separating the DDG at the cyclone separator.

The wet grain remaining after the fermentation process incidental to obtaining the wort is delivered by a pump 350 to a hot gas preheater 352. The stream of DDG under pressure is next injected at the orifice of a nozzle 354 into the cyclone chamber of a cyclone separator 356. The principle of cyclone separation is well known. In effect, the heavier grain material is thrown to and swirls about the larger diameter while the lighter weight materials and particularly the water vapor remain in the quiescent part (center area) of the cycloner where they are extracted by an eduction pipe 358.

The wall of the cyclone separator is heated by a BTU transport liquid confined by the heater coil (or heater jacket) 360. The product emergent from the bottom of the cyclone separator is a thoroughly dried DDG product from which substantially the entire water content has been removed, contrary to the present product of commerce.

The water vapor withdrawn by pipe 358 is delivered to a column 364 which may be similar to or even identical to the stripper-rectifier column 284 described above. Thus the column 364 may be constructed to contain an internally baffled chiller core 366 chilled by entrant cold water and the column may be surrounded by a water jacket (chiller loop) 368 also supplied with cold water. Consequently, the water vapor delivered by pipe 358 to the top of the condenser 364 condenses on the inside and the heat of condensation (900 BTUs per pound) is recovered by the water or other fluid circulating in the chiller jacket 368. The fluid circulating in the chiller jacket 368 will be faced in heat-exchange relation to the evaporator of an LHR loop of the kind described above whereby the latent heat of condensation derived from column 364 may be delivered to the coil 360 which represents the condenser of the BTU transport system denoted by legend LHR COND.

The water condensate may be withdrawn from the bottom of the condenser column 364 through a pipe 372. It may be used as a source of hot water, depending on the amount of sensible or caloric heat not surrendered to the LHR system.

DDG is not the only biomass which may be dried in the manner explained above because there are numerous products where the cost of removing a large water content is prohibitive, restricting transportation of the product. Algae contains almost eighty percent water, for example, and this is equally true of many natural fertilizer materials.

I claim:

1. A method of conserving energy while processing a process liquid in a process stream to recover its latent heat of condensation for return to the process stream and comprising the following steps:
    (1) providing an open process stream having a first heat accepting means and a first heat rejecting means;
    (2) providing a closed refrigerator loop having second heat accepting means and second heat rejecting means;
    (3) providing a closed chiller loop having third heat accepting means and third heat rejecting means;
    (4) indirectly exchanging heat between said second heat accepting means and said third heat rejecting means;
    (5) indirectly exchanging heat between said first heat rejecting means and said third heat accepting means; and
    (6) indirectly exchanging heat between said second heat rejecting means and said first heat accepting means, thereby enabling said latent heat to be passed to the chiller loop and from there to the refrigerator loop for exchange back to the process stream, and allowing adjustments to be made in the refrigerator loop for efficiency and performance without necessarily effecting the chiller loop.

2. A method according to claim 1 wherein the process liquid is a biomass and the source of latent heat of condensation is an alcohol derived from the biomass.

3. A method according to claim 1 or 2 in which the chiller loop circulates a body of water.

4. A method according to claim 1 in which step (4) is accomplished by exchanging heat to a hot fluid in the refrigerator loop and including the step of subsequently compressing that fluid to a higher density prior to completing step (6).

5. A method according to claim 1 or 4 in which the process liquid is moisture trapped in a biomass to be dried.

6. A method according to claim 4 in which step (6) includes exchanging heat between said compressed fluid and said process liquid.

7. A method according to claim 1 in which step (6) is conducted in a process vessel having a vapor space above the process liquid which is contained therein, including the step of exchanging heat according to step (6) to said process liquid to vaporize it in said vapor space, and including the additional step of so condensing the vapor as to comply with steps (4) and (5).

8. A method according to claim 7 in which the process liquid is entrained in a solid body in the process vessel.

9. A method according to claim 7 or 8 in which the process vessel is a rectifier column having a hollow chiller core centered in said vapor space, and including the step of delivering water to said chiller core to help condense vapor in said vapor space.

10. A method according to claim 1 or 7 in which the heat exchange under step (6) is conducted in stages.

11. Method according to claim 1 or 7 in which the process liquid is combined with a solid body which is grain, algae or other biomass.

* * * * *